United States Patent [19]

Morimura et al.

[11] Patent Number: 4,467,992
[45] Date of Patent: Aug. 28, 1984

[54] POWER-UNIT MOUNTING STRUCTURE FOR AUTOMOTIVE VEHICLE

[75] Inventors: Hiroaki Morimura, Atsugi; Hideki Minami, Tokyo; Shunichiro Kanai, Sagamihara, all of Japan

[73] Assignee: Nissan Motor Company, Limited, Yokohama, Japan

[21] Appl. No.: 423,284

[22] Filed: Sep. 24, 1982

[30] Foreign Application Priority Data

Oct. 12, 1981 [JP] Japan .................. 56-162359

[51] Int. Cl.³ ........................... F16M 11/12
[52] U.S. Cl. .................... 248/659; 180/300
[58] Field of Search ........... 248/659, 660, 666, 606, 248/607, 593, 605; 180/300, 312

[56] References Cited

U.S. PATENT DOCUMENTS

| | | | |
|---|---|---|---|
| 1,834,879 | 12/1931 | Trott | 180/300 |
| 2,056,873 | 10/1936 | Trott | 248/607 |
| 2,308,311 | 1/1943 | Saurer | 248/605 |
| 2,934,297 | 4/1960 | Mitzl | 248/607 |
| 2,953,336 | 9/1960 | Etchells | 248/605 |
| 3,509,393 | 4/1970 | Roddy | 248/606 |
| 3,685,773 | 8/1972 | Otto | 248/606 |
| 3,718,304 | 2/1973 | Schulz et al. | 248/659 |
| 3,730,462 | 5/1973 | Dick | 248/659 |
| 3,770,231 | 11/1973 | Kirchgessner et al. | 248/659 |
| 3,825,090 | 7/1974 | Runkle | 248/659 |

Primary Examiner—William H. Schultz
Assistant Examiner—Ramon O. Ramirez
Attorney, Agent, or Firm—Lane, Aitken & Kananen

[57] ABSTRACT

A power-unit mounting structure for mounting a power unit such as an internal combustion engine on the body structure of an automotive vehicle, comprising a plurality of shock and vibration dampening units each comprising a resilient insulator block securely connected between the body structures of the vehicle and the power unit, wherein the shock and vibration dampening units include a pair of shock and vibration dampening units, the respective insulator blocks of which are disposed in such a manner as to produce shear stresses in directions parallel with each other and inclined with respect to the vehicle body structure at a predetermined angle of, preferably, 45 degrees to vertical and horizontal planes.

15 Claims, 6 Drawing Figures

POWER-UNIT MOUNTING STRUCTURE FOR AUTOMOTIVE VEHICLE

FIELD OF THE INVENTION

The present invention relates to a power-unit mounting structure used for the mounting of a power unit such as an internal combustion engine of an automotive vehicle.

SUMMARY OF THE INVENTION

In accordance with the present invention, there is provided a power-unit mounting structure for mounting on the body structure of an automotive vehicle a power unit having a rotatable output shaft extending in a lateral direction of the vehicle body structure, comprising a plurality of shock and vibration dampening units each comprising a resilient insulator block securely connected between the body structure of the vehicle and the body structure of the power unit, wherein the shock and vibration dampening units include a pair of shock and vibration dampening units, the respective insulator blocks of which are disposed in such a manner as to produce shear stresses in directions which are substantially parallel with each other and which are inclined with respect to the vehicle body structure at a predetermined angle to vertical and horizontal planes.

BRIEF DESCRIPTION OF THE DRAWINGS

The drawbacks of a prior-art power-unit mounting structure and the features and advantages of a power-unit mounting structure according to the present invention will be more clearly understood from the following description taken in conjunction with the accompanying drawings in which.

DESCRIPTION OF THE PRIOR ART

Figure 1:
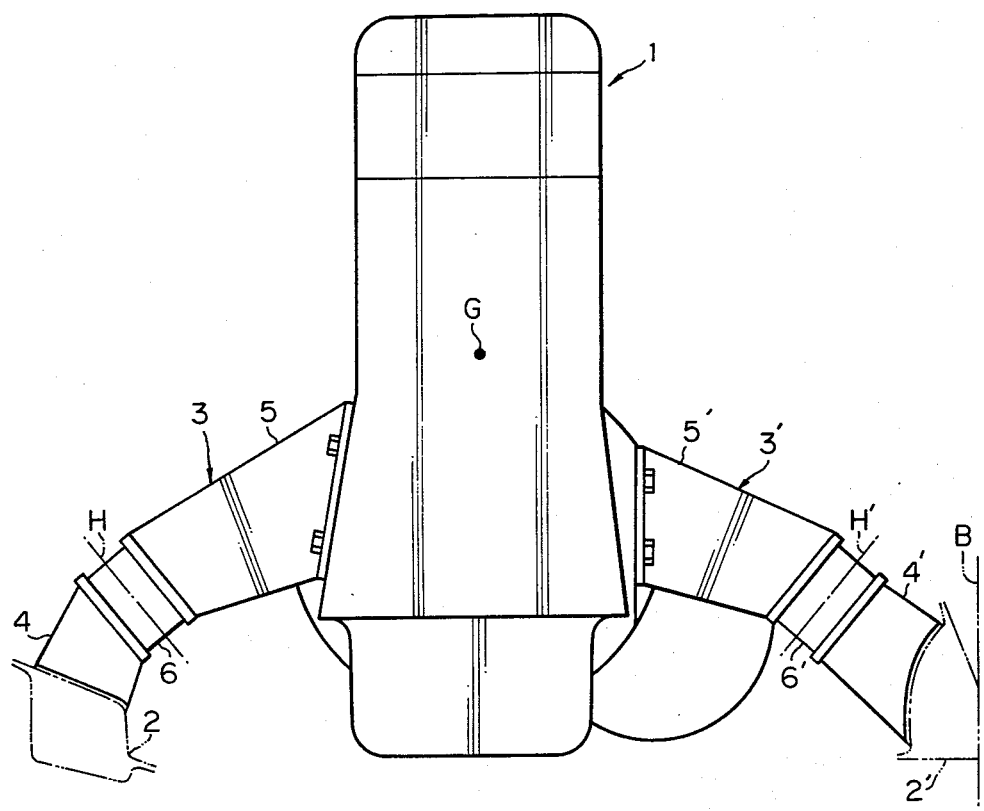
FIG. 1 is a side elevation view showing an example of a prior-art power-unit mounting structure.

For the better understanding of the features and advantages of a power-unit mounting structure according to the present invention, description will be hereinafter made with reference to FIG. 1 which shows a representative example of a prior-art power-unit mounting structure. The prior-art power-unit mounting structure shown in FIG. 1 is used for the mounting of a power unit such as an internal combustion engine 1 on the body structure B of an automotive vehicle in such a manner that the output shaft of the engine 1 has an axis of rotation in a lateral direction of the vehicle body B. Thus, the power-unit mounting structure includes rigid first and second support members 2 and 2' which are constituted by front and rear structural members, respectively, of the vehicle body B as indicated by phantom lines.

The prior-art power-unit mounting structure further includes first and second shock and vibration dampening units 3 and 3', the former of which is securely connected between the first support member 2 and the first engine-side bracket member 5, and the latter of which is securely connected between the second support member 2' and the second engine-side bracket member 5'. The first shock and vibration dampening unit 3 comprises a rigid body-side bracket member 4 securely connected to the first support member 2, a rigid engine-side bracket member 5 secured to a front wall portion of the body structure of the engine 1, and a resilient insulator block 6 securely connected between the body-side bracket member 4 and the engine-side bracket member 5. Likewise, the second shock and vibration dampening unit 3' comprises a rigid body-side bracket member 4' securely connected to the second support member 2', a rigid engine-side bracket member 5' secured to a rear wall portion of the engine body structure of the engine 1, and a resilient insulator block 6' securely connected between the body-side bracket member 4' and the engine-side bracket member 5', as shown. Each of the insulator blocks 6 and 6' is arranged so that the insulator blocks 6 and 6' are to be subjected to shear stresses in directions inclined at the angle of 45 degrees to a vertical plane forwardly and rearwardly, respectively, of the vehicle body B as indicated by H and H', respectively.

The directions H and H' of shear stresses are symmetrical with respect to a vertical plane which passes through the center of gravity G of the internal combustion engine 1. The internal combustion engine 1 supported by the shock and vibration dampening units 3 and 3' is, for this reason, subject to vibrations in a vertical direction. When shocks and vibrations transmitted from the road surface to the support members 2 and 2' of the vehicle body B are distributed to the internal combustion engine 1 through the first and second shock and vibration dampening units 3 and 3', the engine 1 is caused to vibrate upwardly and downwardly with respect to the vehicle body B. The vibrations thus produced in the internal combustion engine 1 are combined with the bouncing motions of the vehicle body B and cause the vehicle to shake. The present invention contemplates provision of a useful solution to this problem.

DESCRIPTION OF THE PREFERRED EMBODIMENTS

Figure 2:
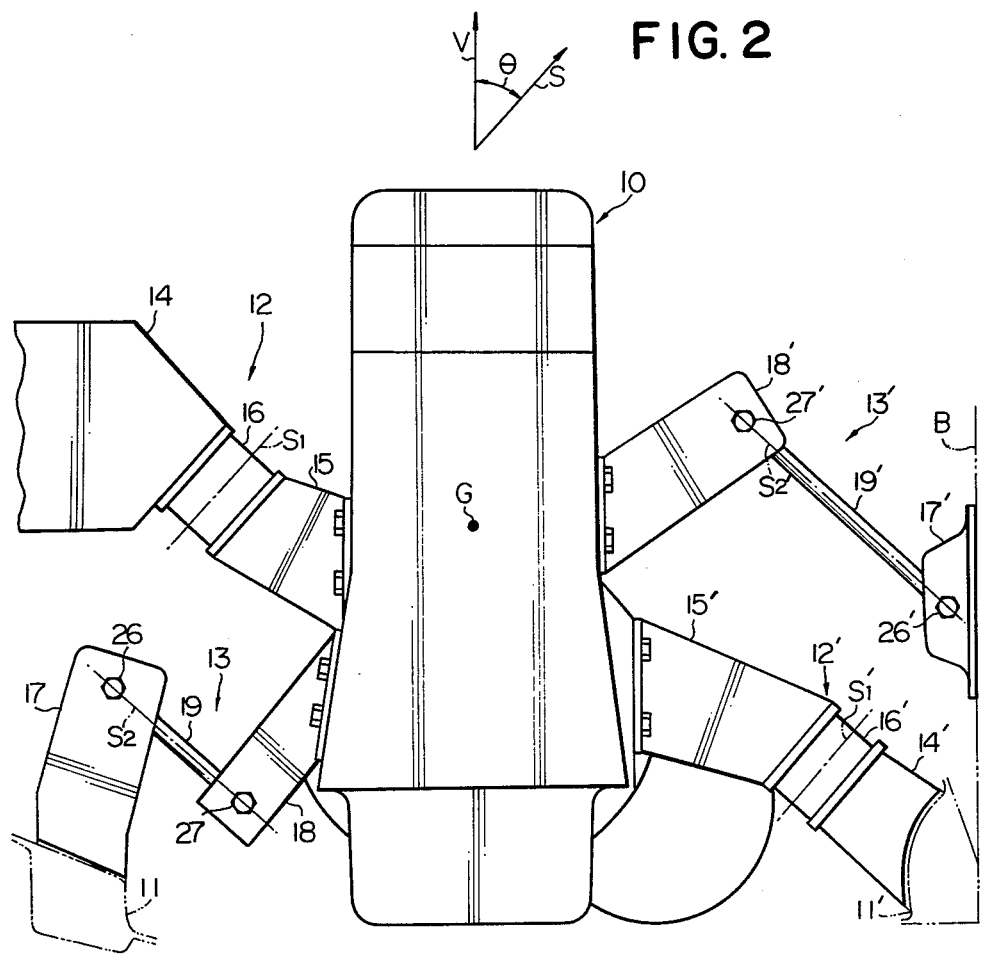
FIG. 2 is a view similar to FIG. 1, but which shows a first preferred embodiment of a power-unit mounting structure according to the present invention.

Referring to FIG. 2 of the drawings, a power-unit mounting structure embodying the present invention is also used for the mounting of an internal combustion engine 10 on the body structure B of an automotive vehicle in such a manner that the output shaft of the engine 10 has an axis of rotation in a lateral direction of the vehicle body B. Thus, the power-unit mounting structure comprises rigid first and second support members 11 and 11' which are constituted by, for example, front and rear structural members, respectively, of the vehicle body B and which are located on planes lower than the center of gravity G of the internal combustion engine 10.

The power-unit mounting structure embodying the present invention further comprises first and second shock and vibration dampening units 12 and 13 provided in front of the engine 10 and third and fourth shock and vibration dampening units 12' and 13' provided at the rear of the engine 10. The first shock and vibration dampening unit 12 comprises a rigid body-side bracket member 14 securely connected to the vehicle body B, and a rigid engine-side bracket member 15 which is secured to a front wall portion of the body structure of the engine 10 and which extends forwardly and upwardly from the engine 10 toward the body-side bracket member 14. The first shock and vibration dampening unit 12 further comprises a resilient insulator block 16 having one end face bonded or otherwise securely attached to the body-side bracket member 14 and the other end face bonded or otherwise securely attached to the engine-side bracket member 15. The insulator block 16 is constructed of, for example, rubber and is connected between the bracket members 14 and 15 in such a manner as to produce a shear stress in a direction S1 which is inclined with respect to the vehicle body B on a plane perpendicular to the axis of rotation of the output shaft of the engine 10. In the embodiment herein shown, the direction S1 of the shear stress is inclined at a predetermined angle of, preferably, about 45 degrees to a vertical plane (indicated at V in FIG. 2) in a fore-and-aft direction of the vehicle body B and is accordingly tangential to an arc which a point on the internal combustion engine 10 describes about the center of gravity G of the engine 10 when the engine 10 is caused to roll about the center of gravity G.

On the other hand, the second shock and vibration dampening unit 13 comprises a rigid body-side bracket member 17 securely connected to the vehicle body B by means of the first support member 11, and a rigid engine-side bracket member 18 which is secured to a front wall portion of the body structure of the engine 10 and which extends forwardly and downwardly from the engine 10 toward the first support member 11. The second shock and vibration dampening unit 13 further comprises a buffer rod assembly 19 which is connected at one end thereof to the body-side bracket member 17 and at the other end thereof to the engine-side bracket member 18. The buffer rod assembly 19 longitudinally extends in a direction S2 which is inclined with respect to the vehicle body B on a plane perpendicular to the axis of rotation of the engine 10. In the embodiment herein shown, the direction S2 of inclination of the buffer rod assembly 19 is approximately perpendicular to the direction S1 of the shear stress to be produced in the insulator block 16 of the first shock and vibration dampening unit 12 and which is thus also tangential to an arc which a point on the engine 10 describes about the center of gravity G of the engine 10 when the engine 10 is caused to roll about the center of gravity G.

The third and fourth shock and vibration dampening units 12' and 13' are per se essentially similar in construction to the above described first and second shock and vibration dampening units 12 and 13, respectively, and are arranged generally in symmetry to the shock and vibration dampening units 12 and 13, respectively, with respect to the center of gravity G of the engine 10. Thus, the third shock and vibration dampening unit 12' comprises a rigid body-side bracket member 14' securely connected to the vehicle body B by means of the second support member 11', and a rigid engine-side bracket member 15' which is secured to a rear wall portion of the body structure of the engine 10 and which extends rearwardly and downwardly from the engine 10 toward the body-side bracket member 14'. The third shock and vibration dampening unit 12' further comprising a resilient insulator block 16' having one end face bonded or otherwise securely attached to the body-side bracket member 14' and the other end face bonded or otherwise securely attached to the engine-side bracket member 15'. The insulator block 16' is also constructed of, for example, rubber and is connected to the bracket members 14' and 15' in such a manner as to produce a shear stress in a direction S1' which is also inclined at a predetermined angle of, preferably, about 45 degrees to the vertical plane V in a fore-and-aft direction of the vehicle body B and which is accordingly tangential to an arc which a point on the internal combustion engine 10 describes about the center of gravity G of the engine 10 when the engine 10 is caused to roll about the center of gravity G. The direction S1' in which a shear stress is to be produced in the insulator block 16' of the third shock and vibration dampening unit 12' is thus approximately parallel with the direction S1 in which a shear stress is to be produced in the insulator block 16 of the first shock and vibration dampening unit 12.

On the other hand, the fourth shock and vibration dampening unit 13' comprises a rigid body-side bracket member 17' securely connected to the vehicle body B, and a rigid engine-side bracket member 18' which is secured to a rear wall portion of the body structure of the engine 10 and which extends rearwardly and upwardly from the engine 10 toward the vehicle body B. The fourth shock and vibration dampening unit 13' further comprises a buffer rod assembly 19' which is connected at one end thereof to the body-side bracket member 17' and at the other end thereof to the engine-side bracket member 18'. The buffer rod assembly 19' longitudinally extends in a direction S2' which is also approximately perpendicular to the direction S1' of the shear stress to be produced in the insulator block 16' of the third shock and vibration dampening unit 12' and which is thus also tangential to an arc which a point on the engine 10 describes about the center of gravity G of the engine 10 when the engine 10 is caused to roll about the center of gravity G. The direction S2' of elongation of the buffer rod assembly 19' of the fourth shock and vibration dampening unit 13' is, thus, approximately parallel with the direction S2 of elongation of the buffer rod assembly 19 of the second shock and vibration dampening unit 13 and is, accordingly, approximately perpendicular to the directions S1 and S1' in which the respective insulator blocks 16 and 16' of the first and third shock and vibration dampening units 12 and 12' are to produce shear stresses.

Figure 3:
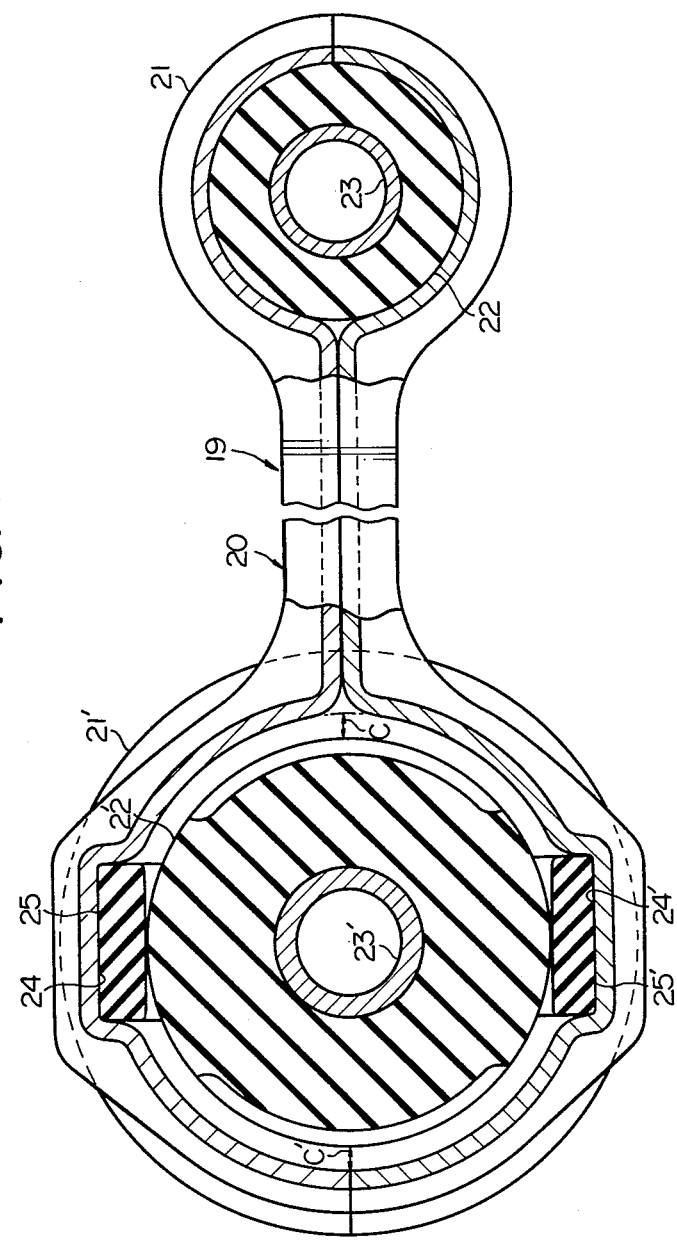
FIG. 3 is a fragmentary sectional view showing the detailed construction of a buffer rod assembly included in the embodiment illustrated in FIG. 2.

FIG. 3 of the drawings shows the detailed construction of each of the buffer rod assemblies 19 and 19' of the second and fourth shock and vibration dampening units 13 and 13', respectively, wherein the buffer rod assemblies 19 and 19' are represented by the buffer rod assembly 19. Referring to FIG. 3, the buffer rod assembly 19 comprises an elongated rigid buffer rod 20 having first and second annular portions 21 and 21' and a stem portion longitudinally extending between the annular portions 21 and 21' in a direction aligned with a line joining the respective center axes of the annular portions 21 and 21'. The first annular portion 21 has bonded or otherwise securely attached to the inner peripheral surface thereof an annular and resilient first insulator block 22 which in turn has a rigid, first annular member or collar 23 coaxially attached to the inner peripheral surface thereof. The second annular portion 21' is larger in diameter than the first annular portion 21 and has a pair of radial recesses 24 and 24' which are open radially inwardly of the annular portion 21' and which are located in diametrically opposite relationship to each other across the center axis of the second annular portion 21' and at right angles to the direction in which the buffer rod 20 is elongated. A generally annular and resilient second insulator block 22' having a pair of radially outwardly protruding lug portions 25 and 25' has its outer peripheral surface bonded or otherwise securely attached to the inner peripheral surface of the annular portion 21'. The lug portions 25 and 25' of the second insulator block 22' are diametrically opposite to each other across the center axis of the second annular portion 21' and are received in the radial recesses 24 and 24', respectively, in the second annular portion 21'. The second annular portion 21' and the insulator block 22' are sized so that there are formed predetermined clearances C and C' between the inner peripheral surface of the second annular portion 21° and the outer peripheral surface of the insulator block 22' in a direction aligned with the line joining the respective center axes of the first and second annular portions 21 and 21'. The insulator block 22' thus attached to the second annular portion 21' has a rigid second annular member or collar 23' coaxially attached to the inner peripheral surface thereof. When the buffer rod assembly 19 thus constructed is subjected to a longitudinally compressive or tensile force so that the first and second annular portions 21 and 21' are urged to be displaced toward or away from each other, each of the first and second insulator blocks 22 and 22' of the buffer rod assembly 19 is caused to deform longitudinally of the buffer rod assembly after the displacement between the first and second annular portions 21 and 21' has been taken up by the clearances C and C' between the inner peripheral surface of the second annular portion 21' and the outer peripheral surface of the insulator block 22'. When, on the other hand, the buffer rod assembly 19 is subjected to a force which urges the buffer rod assembly 19 to turn about the center axis of one of the first and second annular portions 21 ad 21', each of the lug portions 25 ad 25' of the second insulator block 22' is caused to deform in a direction parallel with the direction (S2 or S2' in FIG. 2) in which a shear stress is to be produced in the buffer rod assembly 19. In the power-unit mounting structure shown in FIG. 2, the buffer rod assembly 19 of the second shock and vibration dampening unit 13 has its first collar 23 securely connected to the body-side bracket member 17 on the first support member 11 by means of, for example, a bolt 26 and its second collar 23' securely connected to the bracket member 18 on the engine 10 by means of, for example, a bolt 27. On the other hand, the buffer rod assembly 19' of the fourth shock and vibration dampening unit 13' has its first collar 23 securely connected to the body-side bracket member 17' on the vehicle body B by means of, for example, a bolt 26' and its second collar 23' securely connected to the bracket member 18' on the engine 10 by means of, for example, a bolt 27'.

The power-unit mounting structure embodying the present invention as hereinbefore described with reference to FIGS. 2 and 3 is characterized in that the power-unit mounting structure has a total of four resilient insulator blocks 16, 22, 16' and 22' in the first, second, third and fourth shock and vibration dampening units 12, 13, 12' and 13', respectively, which are arranged generally symmetrically with respect to the center of gravity G of the internal combustion engine 10. The respective insulator blocks 16 and 16' of the first and third shock and vibration dampening units 12 and 12' are disposed so that the directions S1 and S1' in which shear stresses are to be produced in the insulator blocks 16 and 16', respectively, are inclined at the predetermined angle of about 45 degrees to the vertical plane V rearwardly of the vehicle body B as indicated by an arrow S in FIG. 2. On the other hand, the respective insulator blocks 22 and 22' of the second and fourth shock and vibration dampening units 13 and 13' are disposed so that the directions S2 and S2' in which shear stresses are to be produced in the insulator blocks 22 and 22', respectively, are inclined at the angle of about 45 degrees to the vertical plane V forwardly of the vehicle body B. Each of the insulator blocks 22 and 22' of the second and fourth shock and vibration dampening units 13 and 13' is, for this reason, to be caused to merely deform or turn in a direction parallel with the direction of the arrow S. It therefore follows that all the insulator blocks 16 and 16' of the first and third shock and vibration dampening units 12 and 12' and the buffer rod assemblies 19 and 19' of the second and fourth shock and vibration dampening units 13 and 13' are to be caused to deform in directions parallel with the direction of the arrow S and have small spring constants (or load rates) in such directions. The internal combustion engine 10 is thus enabled to be easily displaced with respect to the vehicle body B in the direction of the arrow S.

When, now, vibrations are transmitted from the road surface to the internal combustion engine 10 through the vehicle body B and the shock and vibration dampening units 12, 13, 12' and 13' during cruising of the vehicle, the engine 10 is caused to oscillate in the direction of the arrow S in which the engine 10 is most easy to move with respect to the vehicle body B. The vibrations transmitted to the engine 10 are in this manner dampened by such movement of the engine 10 so that the vehicle is precluded from causing shakes that would otherwise result from the vibrations transmitted to the engine 10 and combined with the bouncing motions of the vehicle body B. On the other hand, the vibrations caused by the rolling motions of the engine 10 are taken up by the deformation of the insulator blocks 16 and 16' of the first and third shock and vibration dampening units 12 ad 12' and the buffer rod assemblies 19 and 19' of the second and fourth shock and vibration dampening units 13 and 13' in the directions S1, S1', S2 and S2', respectively, of shear stresses of the units if the amplitudes of the vibrations are limited within a relatively small range. If the vibrations transmitted to the engine 10 have relatively large amplitudes, the buffer rod assemblies 19 and 19' of the second and fourth shock and vibration dampening units 13 and 13' prevent the engine 10 from being displaced excessively.

Figure 4:
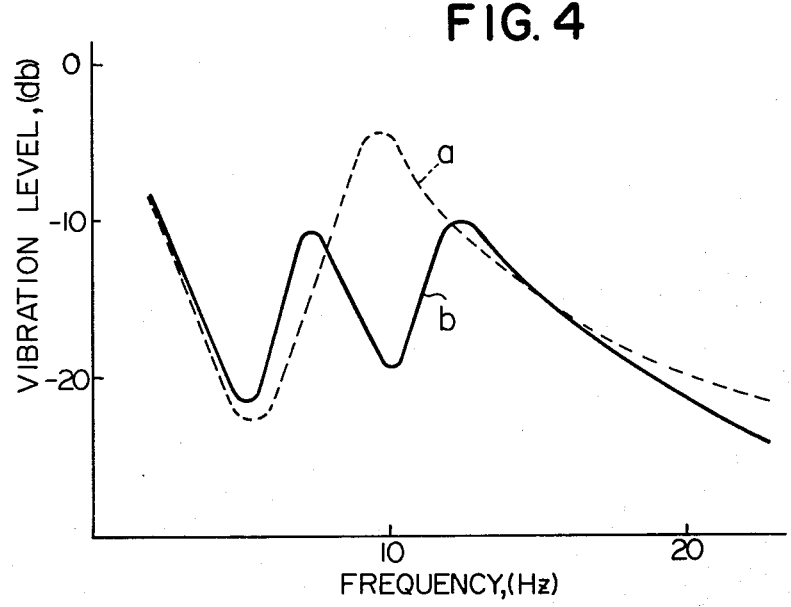
FIG. 4 is a graph showing the vibration characteristics of vehicle body structures on which power units are mounted by a prior-art power-unit mounting structure and the power-unit mounting structure embodying the present invention.

FIG. 4 of the drawings shows the relationship between the vibration frequency in Hertz and the vibration level in decibels of a vehicle body B as observed in an automotive vehicle using the prior-art power-unit mounting structure described with reference to FIG. 1 and an automotive vehicle using the power-unit mounting structure embodying the present invention as hereinbefore described. In FIG. 4, curve a in a broken line indicates such a relationship observed in the automotive vehicle using the prior-art, while curve b in a full line indicates the relationship observed in the automotive vehicle using the power-unit mounting structure embodying the present invention. From comparison between these curves a and b, it will be seen that the vibration level of the vehicle body B of an automotive vehicle using the power-unit mounting structure embodying the present invention is lower than the vibration level of the vehicle body B of an automotive vehicle using the prior-art power-unit mounting structure at vibration frequencies in the vicinity of 10 Hertz. This means that the power-unit mounting structure proposed by the present invention is adapted to prevent an automotive vehicle from causing shakes that would otherwise be caused by the vibrations transmitted to the power unit of the vehicle. When the engine 10 is urged to roll, longitudinally compressive and tensile forces are exerted on the buffer rod assemblies 19 and 19' of the second and fourth shock and vibration dampening units 13 and 13', respectively. Under these conditions, the insulator blocks 22 and 22' of the buffer rod assemblies 19 and 19', respectively, are caused to deform in longitudinal directions of the assemblies and constrain the engine 10 from being caused to roll.

Figure 5:
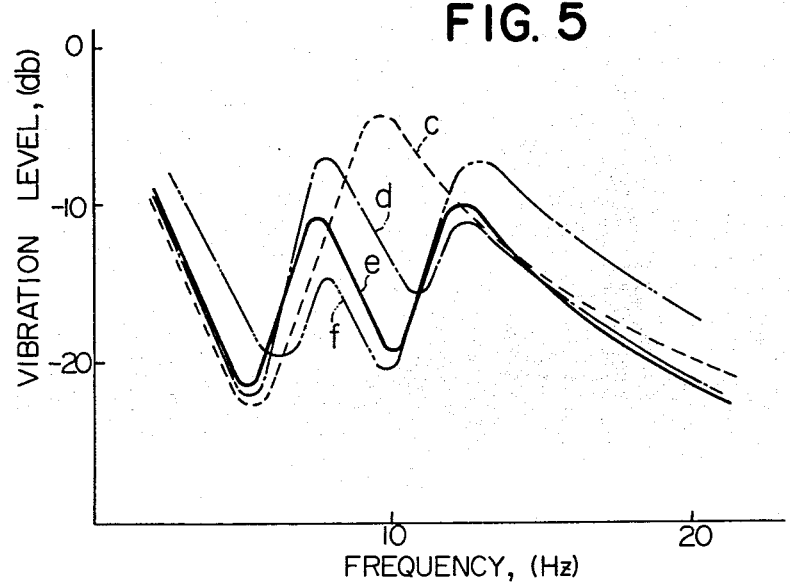
FIG. 5 is a graph showing other vibration characteristics of vehicle body structures on which power units are mounted by a power-unit mounting structure embodying the present invention and modifications thereof.

FIG. 5 of the drawings shows how the vibration level of a vehicle body B using a power-unit mounting structure embodying the present invention varies in the direction of the arrow S in which a power unit is easiest to move with respect to the vehicle body B. The direction of the arrow S is changed when the directions S1, S1', S2 and S2' are changed with respect to the vehicle body B. In the graph of FIG. 5, curves c, d, e and f indicate the vibration levels of the vehicle body B as observed when the direction of the arrow S is selected at the angles (denoted by $\theta$ in FIG. 2) of 0°, 30°, 45° and 60°, respectively. As will be seen from these curves c, d, e and f, the vibration level of the vehicle body B decreases in the neighborhood of 10 Hertz and increases in the neighborhood of 13 Hertz as the angle $\theta$ increases, viz., the direction of the arrow is inclined rearwardly of the vehicle body B. The average vibration level of the vehicle body B is thus reduced to a minimum at the angle $\theta$ of 45 degrees. This is the reason for which the directions of the shear stresses to be produced in the individual shock and vibration dampening units 12, 13, 12' and 13' are inclined at the angle of 45 degrees rearwardly of the vehicle body B in the power-unit mounting structure embodying the present invention.

Figure 6:
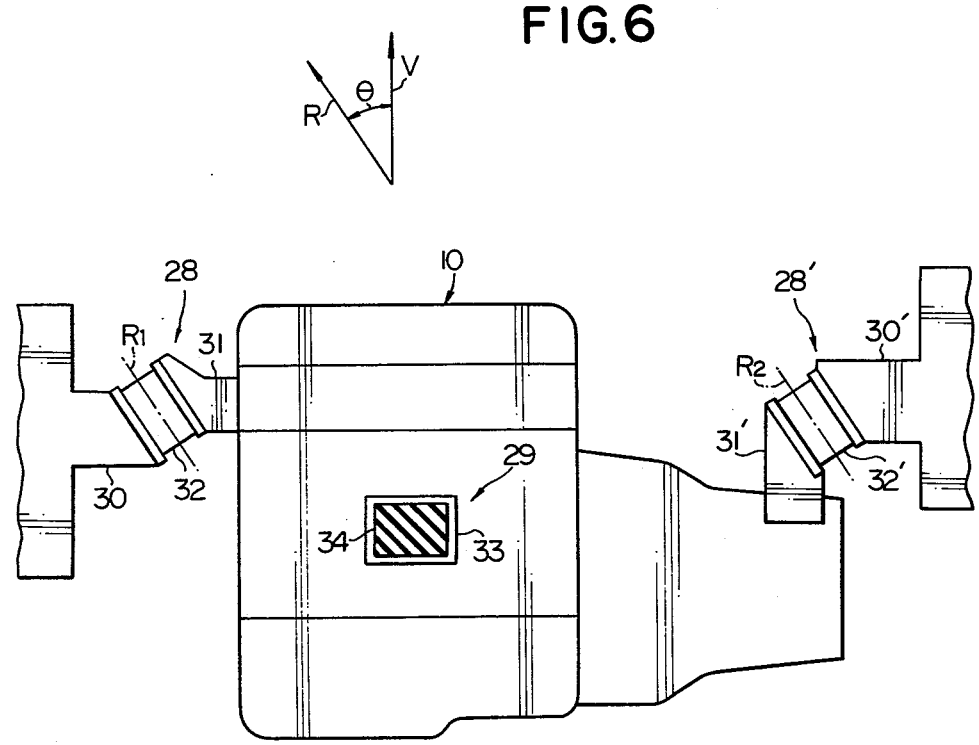
FIG. 6 is a rear end view showing a second preferred embodiment of a power-unit mounting structure according to the present invention.

FIG. 6 of the drawings shows a second preferred embodiment of a power-unit mounting structure according to the present invention. The power-unit mounting structure herein shown is also used for the mounting of an internal combustion engine 10 on the body structure of an automotive vehicle with the output shaft of the engine 10 disposed in a lateral direction of the whole body.

The power-unit mounting structure embodying the present invention comprises first and second shock and vibration dampening units 28 and 28' which are disposed on both sides of the internal combustion engine 10 and a third shock and vibration dampening unit 29 disposed in a fore-and-aft direction of the vehicle body B with respect to the engine 10. The first shock and vibration dampening unit 28 comprises a rigid body-side bracket member 30 securely connected to or integral with the vehicle body B, and a rigid engine-side bracket member 31 which is secured to one side wall portion of the body structure of the engine 10 and which extends laterally or transversely from the engine 10 toward the body-side bracket member 30. The first shock and vibration dampening unit 28 further comprises a resilient insulator block 32 having one end face bonded or otherwise securely attached to the body-side bracket member 30 and the other end face bonded or otherwise securely attached to the engine-side bracket member 31. The insulator block 32 is constructed of, for example, rubber and is connected between the bracket members 30 and 31 in such a manner as to produce a shear stress in a direction R1 which is inclined with respect to the vehicle body on a plane parallel with the axis of rotation of the engine 10. In the embodiment herein shown, the direction R1 is inclined at a predetermined angle to a vertical plane (indicated at V) laterally or transversely of the vehicle body. Likewise, the second shock and vibration dampening unit 28' comprises a rigid body-side bracket member 30' securely connected to or integral with the vehicle body, and a rigid engine-side bracket member 31' which is secured to the other end side wall portion of the body structure of the engine 10 and which extends upwardly from the engine 10 toward the body-side bracket member 30'. The second shock and vibration dampening unit 28' further comprises a resilient insulator block 32' having one end face bonded or otherwise securely attached to the body-side bracket member 30' and the other end face bonded or otherwise securely attached to the engine-side bracket member 31'. The insulator block 32' is also constructed of, for example, rubber and is connected between the bracket members 30' and 31' in such a manner as to produce a shear stress in a direction R2 which is parallel with the direction of the shear stress to be produced in the insulator block 32 of the first shock and vibration dampening unit 28. On the other hand, the third shock and vibration dampening unit 29 comprises a rigid body-side bracket member (not shown) securely connected to the vehicle body, a rigid engine-side bracket member 33 secured to a rear wall portion of the engine 10, and a resilient insulator block 34 having one end face bonded or otherwise securely attached to the body-side bracket member and the other end face bonded or otherwise securely attached to the engine-side bracket member 33. The insulator block 34 is also constructed of, for example, rubber and is connected between the body-side and engine-side bracket members in such a manner as to produce a shear stress in a vertical direction.

The first and second shock and vibration dampening units 28 and 28' being constructed so that directions R1 and R2 in which shear stresses are to be produced in the insulator blocks 32 and 32', respectively, are inclined at the angle $\theta$ to the vertical plane V leftwardly as shown or righwardly of the vehicle body as indicated by an arrows R1 and R2, the engine 10 is easiest to move in the directions of the arrows R1 and R2 and is thus permitted to oscillate in the particular direction in response to vibrations transmitted thereto from the vehicle body. The embodiment shown in FIG. 6 is thus adapted to provide results essentially similar to those achieved in the embodiment described with reference to FIGS. 2 and 3.

What is claimed is:

1. A power-unit mounting structure for mounting on the body structure of an automotive vehicle a power unit having a rotatable output shaft extending in a lateral direction of the body structure, comprising a plurality of shock and vibration dampening units each comprising a resilient insulator block which is structurally adapted to be securely connected between the body structure of the vehicle and the body structure of the power unit, wherein said shock and vibration dampening units include a pair of shock and vibration dampening units the respective insulator blocks of said pair being disposed in such a manner as to produce shear stresses in directions which are substantially parallel with each other and which are adapted to be inclined with respect to the body structure of the vehicle at a predetermined angle to vertical and horizontal planes.

2. A power-unit mounting structure as set forth in claim 1, in which said directions are substantially tangential to an arc which a point on the power unit describes about the center of gravity thereof when the power unit is caused to roll about the center of gravity with respect to the body structure of the vehicle.

3. A power-unit mounting structure as set forth in claim 1, in which the respective insulator blocks of said pair of shock and vibration dampening units are inclined with respect to the body structure of the vehicle at the angle of about 45 degrees to a vertical plane.

4. A power-unit mounting structure as set forth in claim 1, 2 or 3, in which said directions are inclined with respect to the body structure of the vehicle on planes substantially perpendicular to the axis of rotation of the output shaft of said power unit.

5. A power-unit mounting structure as set forth in claim 1, in which said pair of shock and vibration dampening units are disposed respectively in front of and at the rear of the power unit.

6. A power-unit mounting structure as set forth in claim 1, in which said pair of shock and vibration dampening units are constituted by a first pair of shock and vibration dampening units and in which said shock and vibration dampening units further include a second pair of shock and vibration dampening units each comprising a rigid buffer rod having first and second annular portions and an elongated stem portion longitudinally extending between the annular portions, annular and resilient first and second insulator blocks securely attached to the inner peripheral surfaces of the first and second annular portions, respectively, and rigid first and second annular members attached to the inner peripheral surfaces of the first and second insulator blocks, respectively, one of the first and second annular members being structurally adapted to be secured to the body structure of the vehicle and the other of the annular members being structurally adapted to be secured to the body structure of the power unit.

7. A power-unit mounting structure as set forth in claim 6, in which said buffer rod is elongated in a direction substantially perpendicular to said directions in which shear stresses are to be produced in the respective insulator blocks of said first pair of shock and vibration dampening units.

8. A power-unit mounting structure as set forth in claim 7, in which said direction of elongation of said buffer rod is substantially tangential to an arc which a point on the power unit describes about the center of gravity thereof when the power unit is caused to roll about the center of gravity with respect to the body structure of the vehicle.

9. A power-unit mounting structure as set forth in claim 7, in which said direction of elongation of said buffer rod is inclined with respect to the body structure of the vehicle at the angle of about 45 degrees to a vertical plane.

10. A power-unit mounting structure as set forth in claim 6, in which one of the insulator blocks of each of said second pair of shock and vibration dampening units is partially spaced radially inwardly from diametrically opposite portions of the inner peripheral surface of the associated one of said annular portions in the direction in which the buffer rod is elongated.

11. A power-unit mounting structure as set forth in claim 6, in which one of said annular portions of said buffer rod has a pair of radial recesses which are open radially inwardly of the annular portion and which are located in substantially diametrically opposite relationship to each other and substantially at right angles to the direction in which the buffer rod is elongated, said one of the insulator blocks of each of said second pair of shock and vibration dampening units having diametrically opposite lug portions received in said radial recesses, respectively.

12. A power-unit mounting structure as set forth in any one of claims 6 to 11, in which the direction in which said buffer rod is inclined with respect to the body structure of the vehicle on a plane substantially perpendicular to the axis of rotation of output shaft of the power unit.

13. A power-unit mounting structure as set forth in claim 12, in which said first pair of shock and vibration dampening units are disposed respectively in front of and at the rear of the power unit and said second pair of shock and vibration dampening units are disposed in front of and at the rear of the power unit.

14. A power-unit mounting structure as set forth in claim 1, 2 or 3, in which said directions are inclined with respect to the body structure of the vehicle on planes substantially parallel with the axis of rotation of the output shaft of the power unit.

15. A power-unit mounting structure as set forth in claim 14, in which said pair of shock and vibration dampening units are disposed on both sides of the power unit laterally or transversely of the body structure of the vehicle and in which said shock and vibration dampening units further include a third shock and vibration dampening unit disposed in a fore-and-aft direction of the body structure of the vehicle with respect to the power unit, the insulator block of said third shock and vibration dampening unit being disposed in such a manner as to produce a shear stress in a vertical direction.

* * * * *